United States Patent Office 3,129,718
Patented Apr. 21, 1964

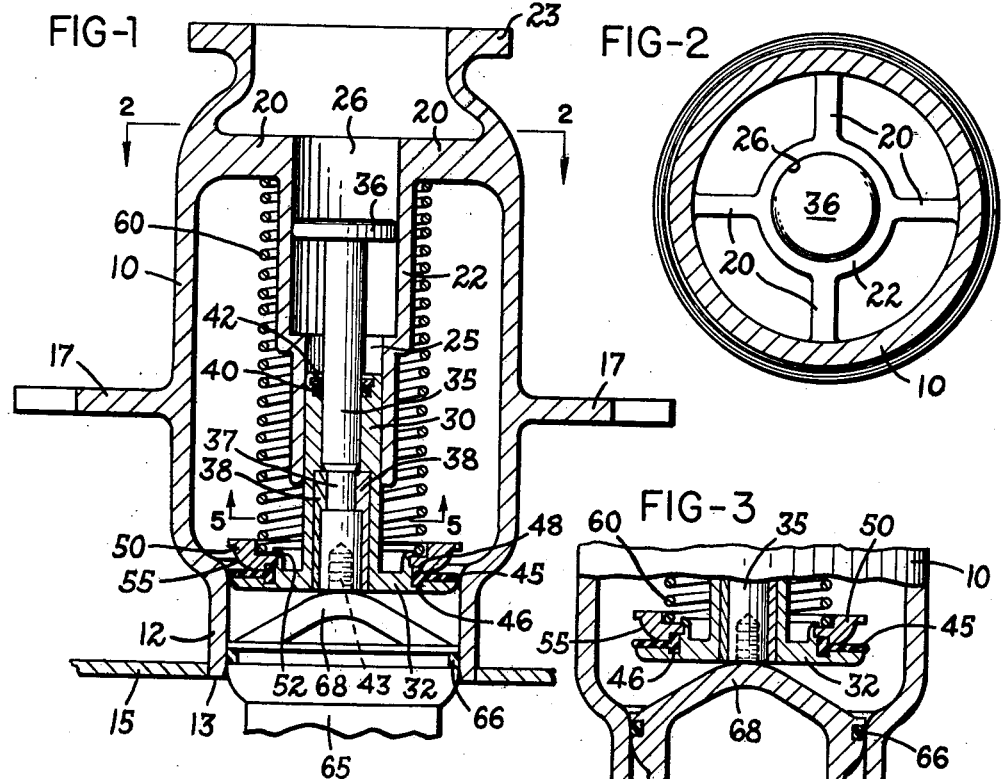

3,129,718
VALVE WITH MEANS FOR LIMITING
SEAL FLEXURE
Albert L. Schlensker, Noblesville, Ind., assignor to Curtis Automotive Devices, Inc., Westfield, Ind., a corporation of Ohio
Filed Dec. 28, 1959, Ser. No. 862,157
4 Claims. (Cl. 137—327)

This invention relates to a valve, particularly to a quick-disconnect valve which may be used, for example, in the connection of jettisonable fuel tanks to aircraft and the like.

Valves of this type are normally held open when the jettisonable tank is mounted on the aircraft, for example by a probe or the like connected to the tank structure. The valve preferably should be capable of accommodating a rather high flow rate with relatively low pressure drop through the valve. The fueling systems and the like in which these valves are used ordinarily operate, on the other hand, with moderately high system pressures, for example in the order of 60 to 80 p.s.i.

When the tank is released or jettisoned the valve must close quickly, without fouling, and without appreciable loss of fuel. Also, the usual design requirements include provision for a substantially continuous surface which will be essentially flush with the skin of the aircraft in the closed position of the valve when there is no tank attached, and the main seals in the valve must be replaceable without removal of the entire valve structure from the aircraft.

Accordingly, the primary object of this invention is to provide an improved quick-disconnect valve incorporating novel sealing structure which will move to a closed position rapidly and provide an effective closing seal over a wide range of operating temperatures.

Another object of this invention is to provide such a valve wherein the valve body includes a tubular seat terminating in an outlet end which may be mounted flush with the aircraft skin, together with a valve head having a leading or masking part which is essentially flat and disk-like, and which will cooperate with the valve outlet to form an essentially continuous surface.

Another object of this invention is to provide valve structure as above described wherein a flexible seal is mounted in the valve head to extend into sealing contact with the valve body, where a backing surface is provided on the valve head following the seal during movement of the valve head to closed position, and the surface is shaped to provide for limited flexure of the seal against the walls of the seat to assure a tight seal under low temperature conditions where the flexible seal tends to harden and lose its normal resilient characteristics.

An additional object of the invention is to provide such a valve structure with a member following behind the flexible seal during movement of the valve head to closed position, and operating against the back surface of the seal to urge it into engagement with the seat in the closed position.

A further object of the invention is to provide such a valve construction wherein the flexible seal may be readily replaced without disturbing the mounting of the valve body.

Other objects and advantages of the invention will be apparent from the following description, the accompanying drawing and the appended claims.

In the drawing—

FIG. 1 is a vertical section through a valve in accordance with the invention, shown in partially closed position, with a portion of a probe shown in elevation moving into the valve seat and tending to open the valve;

FIG. 2 is a section taken on line 2—2 of FIG. 1;

FIG. 3 is a partial view similar to FIG. 1 showing the valve in fully open position;

FIG. 4 is a view similar to FIG. 3 showing the valve in fully closed position;

FIG. 5 is an enlarged sectional view taken on line 5—5 of FIG. 1; and

FIG. 6 is a partial view similar to FIG. 1, showing a modified form of the invention.

Referring to the drawing, which illustrates a preferred embodiment of the invention, the valve includes a valve body 10 of generally cylindrical shape having a lower inlet port or seat end 12 of somewhat reduced tubular cross-section, preferably cylindrical, which is adapted to be mounted with its outer edge 13 flush with the skin of the aircraft, a portion of which is shown diagrammatically at 15. The mounting of the valve body may be accomplished in any suitable fashion, for example by bolts (not shown) which fasten through flanges 17 integrally formed on the exterior of the body 10.

Within the upper end of the valve body, particularly as shown in FIG. 2, there is an integral spider formation 20 formed, for example, of four integral arms which support a central hollow body portion 22. At its upper end the valve body is provided with a connecting flange 23 which may be attached to the fuel system of the aircraft. Thus, assuming that flow is passing from an exterior jettisonable tank, the direction of flow would be through the seat 12 and the body 10 and thence through the connecting flange 23 into the system.

The central portion 22 includes a main central bore 25 and an enlarged upper coaxial bore 26. Within the main bore there is received a valve member or poppet 30 which has a lower head 32 of essentially disk-like configuration machined to fit closely, but in somewhat spaced relation, within the seat portion 12 of the valve body. A poppet stem 35 having an enlarged head 36 extends through the center of the poppet member 30 and includes an undercut central portion 37 in which is received the enlarged heads of a pair of half cylindrical keys 38 (FIGS. 1 and 5). The stem 35 is sealed to the poppet body 30 by an O-ring 40 held in position by a suitable snap ring 42, or the like. The lower end of the stem 35 is threaded, as shown at 43 and thus adapted to be engaged with a tool which will provide for relative movement between the poppet and the stem when the valve body 32 is held in position, resulting in the release of the keys 38 and separation of these parts. Therefore, the poppet may be removed from the valve body while the stem 35 remains within.

A seal 45 formed of flexible resilient material, for example a synthetic rubber material known commercially as neoprene, and of generally T-shape in cross-section as shown, is carried on the back of the head 32, with one portion of the seal ring received in a groove 46 within the head. This seal is of disc-like construction, and has a radial dimension or width substantially greater than its thickness, as can be seen from FIGS. 1 and 3 in particular. The other or upper half of the seal T-head is received in a recess or shoulder portion 48 formed in a retainer ring 50 which is in turn held onto the poppet head by a section 52 being formed over the inner edge of the retainer ring. As shown particularly in FIG. 4, the seal is of somewhat greater peripheral dimension than the interior of seat 12, thus assuring complete contacting of the seal with the seat.

The outer face of the retainer ring forms a backing surface 55 curving upwardly away from the radially outward portions of the seal 45. The retainer ring 50, including such backing surface, can be received entirely within the tubular valve seat, as shown in FIG. 4. A main spring 60 extending around the central portion 22, and abutting the spiders 20, is seated at its lower end within the retainer ring and thus exerts a biasing force in the valve-closing direction against the poppet head and its assembled parts, urging them toward the completely closed position shown in FIG. 4, where the disk-like head 32 is flush with the outer edge 13 of the valve body and presents an essentially continuous surface therewith. The enlarged head 36 on the poppet stem, which is rather loosely fit within bore 26, provides a stop which limits movement of the valve head in this position.

In use, the valve is normally biased closed unless an auxiliary or jettisonable tank is attached, and then a tubular probe 65 carrying a seal ring 66 is thrust into the seat portion 12 as the tank is attached. The probe includes an outwardly extending spider 68 which engages with the valve head and urges the entire movable valve structure upwardly against spring 60 to the fully open position shown in FIG. 3, at which time fluid can flow through the probe 65 and through the valve structure.

The service temperature requirements for valves of this type extend over a substantial range, for example from +135° F. to about —65° F. Particularly at the lower end of this temperature range there has been a tendency toward seal failure, since the seals tend to harden considerably at these lower temperatures and become brittle. They accordingly lose much of their resilient strength and extensive flexing of the seals at these lower temperatures will result in breakage, with consequent leakage and valve failure. With the present construction the backing surface 55 supports the rear of the seal 45 as it flexes from contact with the finished inner seat surface of the seat 12. Thus, there is only limited flexing of the seal, as seen particularly in FIG. 4, but there is sufficient room for the seal to flex when it has hardened due to low temperature, and thus good sealing with the seat is not entirely dependent upon internal flexing or change of shape of the resilient seal. At the same time, the flexure provided is such that the seal is not bent around any sharp edges, and thus local stresses are not created during low temperature operations which might result in cracking of the seal.

To remove the poppet head and replace the seal, it is necessary only to insert a threaded tool into engagement with the threaded head 43 of the poppet stem. If the head 32 is then held upwardly (generally in its position in FIG. 3) as the stem is pulled down, the half cylindrical keys 38 can be removed, and then the entire poppet and valve head assembly, together with the retainer 50, can be removed through the seat opening for service thereon, and particularly replacement of the seal 45.

FIG. 6 illustrates a modified form of valve which includes all the structure of FIG. 1, and to which structure the same reference numerals are applied, and which in addition provides parts associated with the poppet assembly which will hold the seal 45 in sealing relation with the seat 12 in the situation where external pressure may be higher than the pressure internally of the valve and the system to which it is connected. If the valve is required to operate under such service conditions, it is important that the seal be maintained, since otherwise air might enter the fuel system and result in an air lock and resultant blockage of fuel supply.

In the modified configuration the retainer 50 includes an integral upwardly extending cylindrical portion 70 around which there is received a biasing sleeve 72 having an inwardly projecting ledge or ring 73 which normally is seated upon the upper edge of the main body portion of the retainer 50. A spring retainer or washer 75 is positioned at the upper end of the cylindrical retainer portion 70 by staking or turning over an upper edge of the portion 70, as indicated at 77. A spring 78 is mounted between the retaining washer 75 and the inwardly extending lip or ring 73 of the sleeve 72, and thus normally urges the sleeve 72 into the position shown.

As will be noted from FIG. 6 the thickness of sleeve 72 essentially makes up the difference between the outer diameter of retainer 50 and the inner diameter or seating surface of the cylindrical seat 12. Thus, with enough clearance being provided for free movement of the parts, when the valve head is urged to its closed position the sleeve 72 follows behind the outer edge of seal 45, and as the edge of the seal in contact with the valve seat tends to flex upwardly it is engaged with the lower edge of the sleeve 72. Then, with the valve closed, if a higher pressure exists outside of the valve seat 12 than interiorly of the valve body 10, the resultant pressure differential tending to flex the seal 45 further inwardly, and away from its seated position, will be resisted by the spring force from spring 78 applied to the outer edge of the seal 45 through the sleeve 72. At the same time, the normal slight spacing between the outer edge of the seal and the lower edge of sleeve 72, in conjunction with the resilient loading provided by spring 78, provides for sufficient flexing of the seal under low temperature conditions to maintain the desired function as previously described in connection with the main embodiment.

From the foregoing description it will be apparent that the present invention provides a novel quick-disconnect valve which is particularly useful in connecting removable or jettisonable fuel tanks to aircraft. The leading face of the valve head is arranged for positioning when the valve is fully closed in essentially flush relation with the edge of the valve seat, and these parts thus can be mounted flush with the aircraft skin to present an essentially continuous surface. The seal mounting, and particularly the arrangement of the seal backing surface 55, provides for limited flexing of the seal and thus protects it from damage when operating under extreme low temperature conditions, by avoiding compression of the seal upon itself under low temperatures where the seal tends to become hard and brittle. Furthermore, the entire poppet valve assembly can be easily removed by access gained through the cylindrical valve seat 12, and thus the seals may be replaced without in any way disturbing the mounting of the valve body 10.

While the forms of apparatus herein described constitute preferred embodiments of the invention, it is to be understood that the invention is not limited to these precise forms of apparatus, and that changes may be made therein without departing from the scope of the invention as defined in the appended claims.

What is claimed is:

1. A quick disconnect valve operable over a wide range of temperature conditions and capable of presenting an essentially continuous surface across the inlet thereof in fully closed position, comprising a tubular valve body terminating in a cylindrical valve seat having an outer end forming the inlet, a valve head adapted to fit closely within said seat, means mounting said valve head in said body for reciprocating movement into and out of said seat for controlling flow through said inlet, biasing means connected to move said valve head to a normally closed position wherein said head extends across said outer end of said seat forming an essentially continuous surface therewith at the inlet, a seal of flexible material carried on said valve head extending radially therefrom for sealing contact with said seat in the closed position, means on said head forming a backing surface for said seal spaced from said seal to provide for limited flexure of said seal against said seat during closing movement of said head, and means surrounding said backing surface and receivable in said seat providing a yieldable biasing force against said seal to urge it away from said backing surface into sealing engagement with said seat in the closed position of said valve.

2. A quick disconnect valve operable over a wide range of temperature conditions and capable of presenting an essentially continuous surface across the inlet thereof in fully closed position, comprising a tubular valve body terminating in a cylindrical valve seat having an outer end forming the inlet, a valve head adapted to fit closely within said seat, means mounting said valve head in said body for reciprocating movement into and out of said seat for controlling flow through said inlet, biasing means connected to move said valve head to a normally closed position wherein said head extends across said outer end of said seat forming an essentially continuous surface therewith at the inlet, a seal of flexible material carried on said valve head extending radially therefrom for sealing contact with said seat in the closed position, means on said head forming a backing surface for said seal spaced from said seal to provide for limited flexure of said seal against said seat during closing movement of said head, and a yieldably mounted biasing sleeve surrounding said backing surface and receivable in said seat providing a yieldable biasing force against the entire periphery of said seal to urge it away from said backing surface into sealing engagement with said seat in the closed position of said valve.

3. A quick disconnect valve operable over a wide range of temperature conditions and capable of presenting an essentially continuous surface across one end thereof in fully closed position, comprising a hollow valve body terminating in a tubular valve seat having an outer end forming a receiving port for a connecting probe, a rigid valve head adapted to fit closely within said seat, means mounting said valve head in said body for reciprocating movement into and out of said seat for controlling flow through said port, biasing means connected to move said valve head to a normally closed position wherein said head extends across said outer end of said seat forming an essentially continuous surface therewith, means limiting movement of said head into said closed position, a seal of flexible material carried on said valve head extending radially therefrom to a peripheral dimension slightly greater than the internal dimension of said tubular valve seat for sealing contact with said seat in the closed position, said seal having a radial dimension substantially greater than its thickness and connection means between said limiting means and said valve head accessible through said port to disengage said head from said limiting means providing for removal of said head and said seal through said seat and said receiving port.

4. A quick-disconnect valve operable under a wide range of temperature conditions and presenting an essentially continuous surface across its inlet when fully closed, comprising a tubular valve body having a cylindrical valve seat of substantial length and terminating in an outer end forming the inlet to said valve, a rigid valve head constructed to fit closely within said seat and having an essentially flat outer surface, means mounting said valve head in said body for telescoping reciprocating movement into and out of said seat to control flow through said seat, means operating between said valve head and said body urging said valve head to a normally closed position extending across said outer end of said seat with said outer surface of said head forming a continuation of said outer end of said seat, a disc-like seal of normally flexible material carried on the other side of said valve head from its said outer surface, said seal having a greater radial dimension than said valve seat and being of substantially greater radial dimension than thickness such that during closing movement of said valve head said seal tends to curve away from said valve head due to contact between the peripheral edge of said seal and said valve seat, and a backing member connected to said valve head and mounted on the opposite side of said seal from said valve head, said backing member also being freely movable through said valve seat and presenting a supporting surface extending radially outward and away from said valve head to form a space between said valve head and said backing surface between which the peripheral portion of said seal can flex within predetermined limits provided thereby during closing movement of said valve head.

References Cited in the file of this patent

UNITED STATES PATENTS

| | | |
|---|---|---|
| 2,226,972 | Greve | Dec. 31, 1940 |
| 2,231,630 | Laddon | Feb. 11, 1941 |
| 2,236,620 | Cornelius | Apr. 1, 1941 |
| 2,802,482 | Arnhold | Aug. 13, 1957 |
| 2,823,048 | Hansen | Feb. 11, 1958 |
| 2,931,385 | Carlisle | Apr. 5, 1960 |